M. H. STARR.
DIAL SCALE.
APPLICATION FILED AUG. 17, 1920.
1,393,179.
Patented Oct. 11, 1921.
2 SHEETS—SHEET 2.
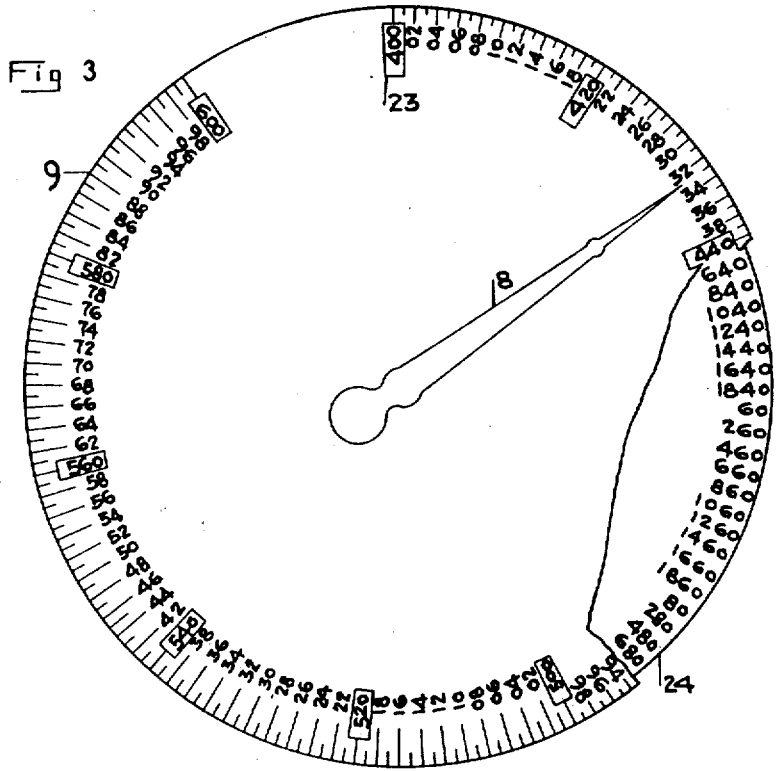
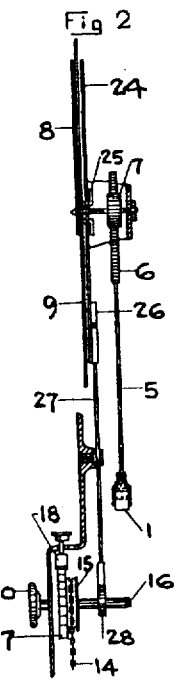
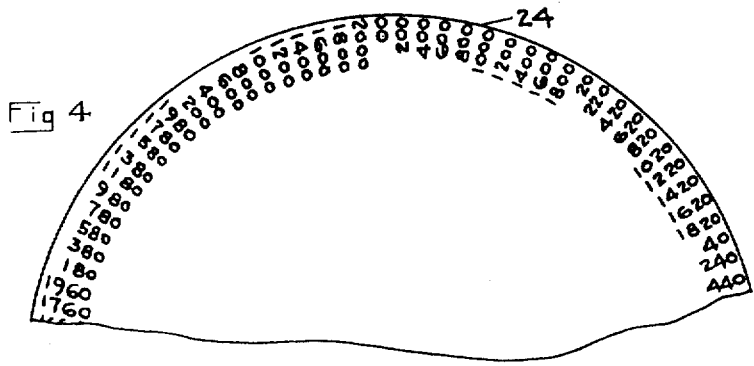
Milton H. Starr
INVENTOR.

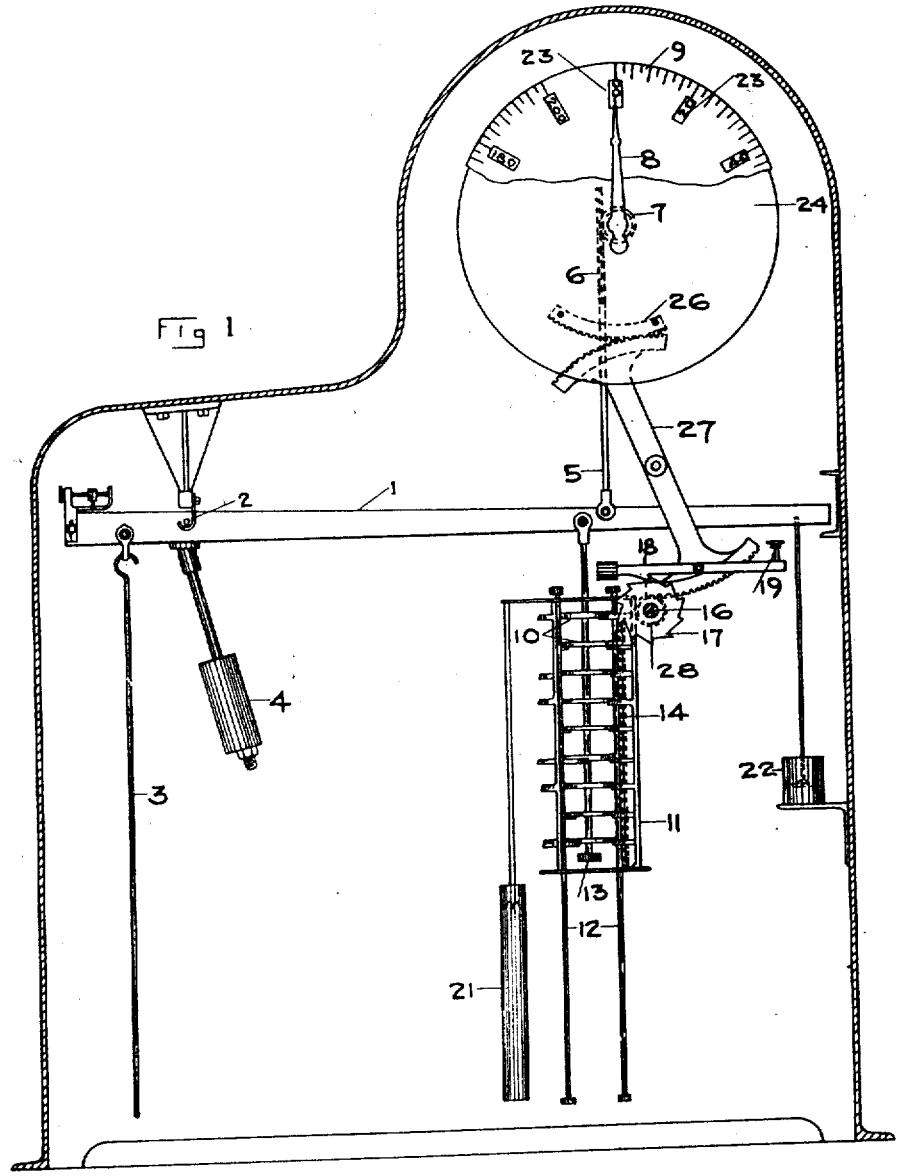

UNITED STATES PATENT OFFICE.

MORTON H. STARR, OF ST. JOHNSBURY, VERMONT, ASSIGNOR TO E. AND T. FAIRBANKS AND COMPANY, OF ST. JOHNSBURY, VERMONT, A CORPORATION OF VERMONT.

DIAL-SCALE.

1,393,179.

Specification of Letters Patent.    Patented Oct. 11, 1921.

Application filed August 17, 1920.  Serial No. 404,267.

*To all whom it may concern:*

Be it known that I, MORTON H. STARR, a citizen of the United States, residing at St. Johnsbury, in the county of Caledonia and State of Vermont, have invented certain new and useful Improvements in Dial-Scales, of which the following is a specification.

This invention relates to dial scales of the type illustrated in Letters Patent No. 1,125,874, January 19, 1915, to H. B. Osgood, and No. 1,159,412, Nov. 9, 1915, to L. A. Osgood, in which a simple dial scale is provided with auxiliary counterbalances and an auxiliary movable dial, by means of which the capacity of the scale is increased or multiplied, the total load being determined by the reading of the main dial taken in connection with the reading of the auxiliary dial.

Among the objects of this invention are the provision of a dial device which shall be more easily read, reducing the chances of error in reading, providing for a more direct indication of the total load without having to combine separated readings; the placing of the indications of the main and auxiliary dials in such relation that the total or combined indication shall be made apparent with the least mental effort; and the provision of improved means for actuating the auxiliary dial.

These objects are attained by means of the construction illustrated in the accompanying drawings which form a part of this specification, and in which, Figure 1 is a front view of the essential parts of a dial scale embodying this invention; Fig. 2 is a side view thereof; Fig. 3 is an enlarged view of the dials, illustrating a typical arrangement of the graduations; and Fig. 4 is a fragmentary view of the auxiliary dial.

In the drawings, the beam 1, supported on the fulcrum bearing 2, is connected by the rod 3 with the lever system of the weighing apparatus, which may be the ordinary form of platform scale. As the load on the platform increases, the beam assumes new positions of rest, the counterpoise pendulum 4, rigidly attached to the beam, always offering a resistance, within the limits of its capacity, sufficient to maintain the beam in equilibrium. The movement of the beam is communicated through the rod 5 and connected rack 6, to the pinion 7; and the pointer 8, connected thereto, assumes a corresponding position on the graduated dial 9. A movement of the pointer over the whole graduated portion of the dial 9, which is slightly less than the whole circumference, corresponds to a movement of the beam throughout its full range of motion.

In order to multiply the capacity of the scale, the auxiliary counterpoise weights 10, are provided, nine of such weights of equal size being shown. These weights are normally disconnected from the weighing mechanism, being supported in spaced relation on the cage 11, which is adapted to have vertical movement on the guides 12. Upon downward movement of the cage, the weights 10 are deposited in succession on the hanger 13, pivoted on the beam 1. Each added weight increases the capacity of the scale by an amount equal to one complete excursion of the pointer, and with nine such weights, the total capacity is ten times the original dial capacity.

The movement of the cage is controlled through the chain 14, attached thereto, and having its other end passed around and secured to the drum 15 on the shaft 16. A ratchet wheel 17 fixed to the same shaft, is normally engaged by a tooth on the weighted lever 18. On depressing the finger piece or button 19, the cage is permitted to descend by gravity, and its motion may be arrested at any point by releasing the lever 18 when the desired number of weights has been added. By operating the hand wheel 20, the cage may be restored to its initial position, the added weights being lifted off the hanger successively in reverse order. A dash pot or other retarding means 21, may be provided to prevent excessively rapid movement of the cage, and damping means 22, is desirable to prevent undue vibration of the beam.

Since with this arrangement, the total load is not determined merely by the position of the pointer, but by this factor in conjunction with the amount of additional counterpoise employed, it is very important that the load indicating device shall so combine these factors as to permit the total load to be read with the minimum of effort and the least possible chance of error.

In the embodiment shown, which illustrates the principle of this invention, but is not to be considered as limiting it to the precise details shown, the fixed dial 9 is graduated around the periphery in 200 one-pound divisions which are marked with the corresponding numbers, except that the numeral of every twentieth unit is omitted and in the place thereof, a rectangular window or aperture 23, is cut through the dial, these windows being thus uniformly spaced and all equally distant from the center of the dial.

An auxiliary dial 24, is coaxially mounted behind the dial 9 and closely adjacent thereto, and is supported in any convenient manner, as on the thimble 25, fixed to the stationary dial 9, so as to permit rotational movement of the dial 24. On the face of the latter dial, there is placed a plurality of series of numbers, one series for each window, so arranged on the rear dial that the successive numbers of each series are displayed consecutively through their corresponding window as the dial 24 is rotated through an angle equal to the angle between adjacent windows.

With the dial 24 in normal position and no load on the scale, the number displayed at each window is the same as the number there omitted from the full series in figuring the dial 9. In this position, the dial appears as the exact equivalent of a simple dial graduated 0–200, the only difference being that every twentieth unit appears on the rear dial through a window instead of on the face of the dial 9. The numbers so appearing (in the present instance 00, 20, 40, 60, etc.,) form the initial terms of the several series of numbers on the movable dial; and the common difference in all of these series is 200, being the capacity of the fixed dial. Thus as shown in Fig. 4, the second series on the movable dial, counting around from the zero position in a clockwise direction, is 20, 220, 420, etc.

Suitable connections are provided for moving the dial 24 in accordance with the weight cage 11, comprising a gear segment 26, secured to the dial 24 and engaging an idler or gear member 27, which is pivotally supported at its center and is in engagement with a pinion 28 fixed on the shaft 16. The arrangement is such that as each additional counterpoise weight is deposited on the hanger 13, the dial 24 is rotated to display the next succeeding number of each series; and the ratchet and pawl device serves to arrest the movement of the parts at any desired point so as to leave the beam and its connections free from interference and to cause the numbers displayed on the rear dial to be in exact register with the apertures.

It is to be noted that the connections described provide a uniform rate of movement of the dial 24 with respect to the shaft 16, by which, the numbers on the dial 24 may be uniformly spaced; and this with the use of the gear elements 26, 27 and 28 which are uniform in manufacture or interchangeable, renders the structure well adapted for quantity production, avoiding the necessity of laying out each individual rear dial by hand to fit its particular instrument, as is the case when a less perfectly constrained movement is employed.

In operation, a load of 200 pounds or less, placed on the scale, will cause the pointer to move in a clockwise direction from its upright or zero position to the proper point on the dial 9, where the corresponding figures will indicate the amount of the load. If the load is greater than 200 pounds, the pointer will pass beyond all the graduations and rest over the blank space on the dial. The button 19, is now depressed, releasing the ratchet 17, the cage 11 descends and weights 10 are deposited on the hanger in succession until the pointer moves back over the graduations whereupon the button 19 is released and the cage movement arrested. In the meantime, the rotation of shaft 16, through the connections described, has caused the dial 24 to move through such an angle as to display the proper graduation numbers according to the number of counterpoise weights added. In Fig. 3, the dial 24 is shown in the position due to the addition of two counterpoise weights, the range of readings being 400 pounds to 600 pounds, and the exact load being indicated as 435 pounds. It is thus seen that the principal graduation numbers suitable for any chosen range of capacity are seen in complete form on the rear dial, while the intermediate or subsidiary graduation numbers are on the front dial.

An important feature of this invention lies in the provision that each and every number displayed on the dials is integrally complete and formed on a single surface, i. e., the digits forming the number are in no case brought into relation by relative movement among themselves, but are always in a unitary fixed group. This results in a marked advantage over the previously known types of dial arrangements in which, the lower digits of a number appear on one dial and the higher digits of the same number are shown on another dial in the rear of the first. With the latter arrangement, such factors as difference of illumination of the two reading surfaces or shadows cast by the front dial, and misalinement of the digits composing a number or non-uniform spacing of the digits, offer ready possibilities of serious errors in reading. Also in those devices in which a circular dial and a surrounding ring in the same plane carry the co-operating digits, the line or crevice between the surfaces and separating the digits, is objectionable. With the arrangement according to this invention, however, all these disadvantages are avoided. The digits of every number are fixed in permanent alinement and uniform spacing, and there are no obstructions or lines to separate one digit from another, thus permitting the ready and accurate reading of the number without confusion.

It is obvious that the graduations and number of apertures may be varied from the details illustrated and described without changing the principles employed. Thus the graduations on the fixed dial might cover the range 0-500 or 0-1000, and the apertures might be located at every fiftieth or every hundredth unit if desired, the object being to insure that for every position of the pointer, there shall be displayed closely adjacent thereto, a total load value which may be observed in connection with the numbered subdivision at which the pointer stands.

The dial devices shown in the two Osgood patents above referred to, are not well adapted for front dial graduations in other ranges than 0-100 or 0-1000 or the like, since, if a range of 0-2000, for example, were employed, it would be necessary to add two separated readings. Thus a load of 3700 pounds would be indicated as 1700 on the front dial and 2000 on the rear dial or target. In the present construction, not only is all adding of separated readings avoided, but the total value readings are so distributed around the dial that it is never necessary to carry a hundreds or thousands digit from a distant point of display and combine it with the reading on the main dial; and this obviates the chance of error in adding readings or in neglecting to consider the rear dial reading.

The numbers on the dial 9 are arranged to be read away from the center of the right-hand portion thereof, and toward the center on the left-hand portion, to avoid inverted figures. This results in a reversal of direction of reading, which should preferably occur near the lowermost portion of the dial; but it should be noted that this change does not affect the placing of the apertures 23, but all such apertures are arranged on a circle concentric with the dial and of uniform size and spacing, which results in a symmetrical and pleasing appearance of the dial.

Having thus fully described the invention, I claim:

1. In a dial scale having means for changing the capacity through successive ranges, a movable dial bearing a plurality of series of numbers, the corresponding terms in the several series representing total weight values for a given range of capacity, a fixed apertured shield in front of the movable dial adapted to expose only the corresponding terms of the series of numbers, and connections actuated by the first named means for positioning the movable dial to expose the proper numbers for each range of capacity of the scale.

2. In a dial scale, balancing means, a device for adding counterpoise weights thereto, means including a rotatable shaft for controlling the said device, a rotatable dial and shield therefor adapted to display weight indicating characters according to the counterpoise weights applied, and means for moving the said dial comprising a gear segment fixed to the dial, a pinion fixed to the said shaft, and an intermediate gear member engaging the gear segment and pinion, whereby the dial is moved proportionately to the counterpoise controlling means.

3. In a dial scale provided with a variable counterpoising means, a rotatably mounted circular dial carrying around its periphery a plurality of series of weight indicating numbers, the first terms of the several series forming an arithmetical progression, and the succeeding terms of each series increasing by a constant common difference, a fixed dial in front of the movable dial and provided with graduation marks and spaced apertures arranged on a circle, and means controlled by the counterpoising means for rotating the first dial to bring the proper number from each series into register with the respective apertures, whereby the weight indications shall always be in conformity to the counterpoising means.

MORTON H. STARR.